US011823461B1

(12) United States Patent
Song et al.

(10) Patent No.: US 11,823,461 B1
(45) Date of Patent: Nov. 21, 2023

(54) SYSTEMS AND METHODS FOR PERCEIVING A SCENE AROUND A MOBILE DEVICE

(71) Applicant: Direct Current Capital LLC, Wilmington, DE (US)

(72) Inventors: Wei Song, Mountain View, CA (US); Royce Cheng-Yue, San Jose, CA (US); Daniel Lowengrub, Mountain View, CA (US)

(*) Notice: Subject to any disclaimer, the term of this patent is extended or adjusted under 35 U.S.C. 154(b) by 791 days.

(21) Appl. No.: 16/587,942

(22) Filed: Sep. 30, 2019

Related U.S. Application Data

(60) Provisional application No. 62/738,989, filed on Sep. 28, 2018.

(51) Int. Cl.
| | |
|---|---|
| *G06V 20/56* | (2022.01) |
| *G01S 17/93* | (2020.01) |
| *G01S 17/89* | (2020.01) |
| *G06T 3/00* | (2006.01) |
| *G01C 21/36* | (2006.01) |
| *G01C 21/26* | (2006.01) |

(52) U.S. Cl.
CPC ........... *G06V 20/56* (2022.01); *G01C 21/265* (2013.01); *G01C 21/362* (2013.01); *G01S 17/89* (2013.01); *G01S 17/93* (2013.01); *G06T 3/0031* (2013.01)

(58) Field of Classification Search
CPC ..... G01C 21/265; G01C 21/362; G01S 17/89; G01S 17/93; G06T 3/0031
See application file for complete search history.

(56) References Cited

U.S. PATENT DOCUMENTS

| | | | |
|---|---|---|---|
| 7,840,355 B2 | 11/2010 | Breed et al. | |
| 8,194,998 B2 | 6/2012 | Saito | |
| 8,311,343 B2 | 11/2012 | Chung | |
| 8,488,877 B1 | 7/2013 | Owechko et al. | |
| 8,731,816 B2 | 5/2014 | Dintzer et al. | |
| 8,907,771 B2 | 12/2014 | Vasquez et al. | |
| 10,854,011 B2 | 12/2020 | Tay et al. | |
| 11,620,906 B2 | 4/2023 | Tay et al. | |
| 2008/0319670 A1 | 12/2008 | Yopp et al. | |

(Continued)

OTHER PUBLICATIONS

Ohn-Bar et al., U.S. Appl. No. 15/271,702, filed Sep. 21, 2016.

(Continued)

*Primary Examiner* — Charles J Han
(74) *Attorney, Agent, or Firm* — Polsinelli PC

(57) ABSTRACT

Systems and methods for perceiving a scene around a mobile device include a sensor system capturing an image of and object list data for the scene around the mobile device. The image includes a point cloud with group(s) of points. An object list is generated from the object list data, and the object list indicates a location and a speed of each surface in a set of surfaces in the scene. A perception system generates a selected perception using the image and the object list. The selected perception is generated based on a comparison of first, second, and third perceptions within a hierarchy. The first perception includes object speed and object location. The second perception includes object classification and object tracking, and the third perception includes object type and object model. A motion planner generates a motion plan for the mobile device based on the selected perception.

14 Claims, 6 Drawing Sheets

(56) References Cited

U.S. PATENT DOCUMENTS

| | | |
|---|---|---|
| 2010/0209013 A1 | 8/2010 | Minear et al. |
| 2011/0098890 A1 | 4/2011 | Lundmark et al. |
| 2011/0286628 A1 | 11/2011 | Goncalves et al. |
| 2012/0027255 A1 | 2/2012 | Endo |
| 2012/0158250 A1 | 6/2012 | Stiegler |
| 2014/0032093 A1 | 1/2014 | Mills |
| 2014/0035777 A1 | 2/2014 | Kim et al. |
| 2014/0067162 A1 | 3/2014 | Paulsen et al. |
| 2014/0343750 A1 | 11/2014 | Minemura et al. |
| 2015/0009010 A1 | 1/2015 | Biemer |
| 2015/0294192 A1 | 10/2015 | Lan et al. |
| 2017/0345321 A1 | 11/2017 | Cross et al. |
| 2018/0158200 A1 | 6/2018 | Metzler et al. |
| 2019/0026956 A1 | 1/2019 | Gausebeck et al. |
| 2019/0108396 A1 | 4/2019 | Dal Mutto et al. |
| 2019/0120947 A1 | 4/2019 | Wheeler et al. |
| 2019/0164018 A1 | 5/2019 | Zhu et al. |
| 2019/0287254 A1 | 9/2019 | Lakshmi Narayanan et al. |
| 2019/0291723 A1 | 9/2019 | Srivatsa et al. |
| 2019/0311546 A1* | 10/2019 | Tay ..................... G05D 1/0088 |
| 2019/0362178 A1 | 11/2019 | Huang et al. |
| 2020/0043186 A1 | 2/2020 | Selviah et al. |
| 2020/0349742 A1 | 11/2020 | Wang et al. |
| 2021/0021495 A1 | 1/2021 | Sawabe et al. |
| 2022/0113159 A1 | 4/2022 | Hou et al. |

OTHER PUBLICATIONS

Ohn-Bar et al., U.S. Appl. No. 15/271,704, filed Sep. 21, 2016.
Foster et al., U.S. Appl. No. 16/781,165, filed Feb. 4, 2020.
Lim et al., U.S. Appl. No. 16/834,974, filed Mar. 30, 2020.

\* cited by examiner

SYSTEMS AND METHODS FOR PERCEIVING A SCENE AROUND A MOBILE DEVICE

CROSS-REFERENCE TO RELATED APPLICATIONS

The present application claims benefit of priority to U.S. Provisional Patent Application No. 62/738,989, entitled "Method for Autonomously Perceiving a Scene around an Autonomous Vehicle" and filed on Sep. 28, 2018, which is specifically incorporated by reference herein in its entirety.

FIELD

Aspects of the present disclosure relate to systems and methods for perceiving a scene around a mobile device and more particularly to autonomously navigating an autonomous machine through a scene based on a selected perception.

BACKGROUND

Mobile devices, such as autonomous vehicles, autonomous machines, personal computing devices, and/or the like, often capture images of a scene around the mobile device to interact with, navigate around, or otherwise understand objects within the scene. However, conventional systems often sacrifice computational speed and accuracy in favor of higher resolution data. As such, it is challenging for the mobile device to identify objects and their respective movements within the scene, particularly to autonomously determine actions, such as navigational actions, in view of the objects within the scene. It is with these observations in mind, among others, that various aspects of the present disclosure were conceived and developed.

SUMMARY

Implementations described and claimed herein address the foregoing problems by providing systems and methods for perceiving a scene around a mobile device. In one implementation, an object list for a scene around a mobile device is obtained. The object list indicates a location and a speed of each surface in a set of surfaces in the scene around the mobile device. An image of the scene around the mobile device is obtained. The image includes a point cloud, and the point cloud is segmented into one or more groups of points. A first perception of the scene is generated by projecting the point cloud onto a horizontal plane in an occupancy grid, and the point cloud in the occupancy grid is labeled based on the object list. A second perception of the scene is generated based on spatial changes of the one or more groups of points from a preceding image to the image. A third perception of the scene is generated by predicting a type and a volumetric extent of the one or more groups of points. The first perception of the scene, the second perception of the scene, and the third perception of the scene define a plurality of perceptions of the scene. A selected perception of the scene is generated. The selected perception of the scene is one of the plurality of perceptions of the scene identified based on a comparison of the first perception of the scene, the second perception of the scene, and the third perception of the scene within a hierarchy.

In another implementation, an object list for a scene around a mobile device is obtained. The object list indicates a location and a speed of each surface in a set of surfaces in the scene around the mobile device. An image of the scene around the mobile device is obtained. The image includes a point cloud, and the point cloud including one or more groups of points. A first perception of the scene is generated. The first perception of the scene includes a first accuracy and a first resolution. A second perception of the scene is generated. The second perception of the scene includes a second accuracy and a second resolution. A third perception of the scene is generated. The third perception of the scene includes a third accuracy and a third resolution. The first, second, and third accuracies form an accuracy hierarchy, and the first, second, and third resolutions form a resolution hierarchy. The method determines whether there is an alignment of the second perception of the scene with at least one of the first perception of the scene or the third perception of the scene based on a detection of an object at an object location in the scene. A selected perception of the scene is generated based on the alignment of the second perception of the scene with at least one of the first perception of the scene or the third perception of the scene, the hierarchy of accuracies, and the hierarchy of resolutions.

In another implementation, a sensor system has a set of sensors arranged on a mobile device. The sensor system captures an image of the scene around the mobile device and object list data for the scene around the mobile device. The image includes a point cloud, and the point cloud includes one or more groups of points. An object list is generated from the object list data, and the object list indicates a location and a speed of each surface in a set of surfaces in the scene around the mobile device. A perception system generates a selected perception of the scene using the image and the object list. The selected perception of the scene is generated based on a comparison of a first perception of the scene, a second perception of the scene, and a third perception of the scene within a hierarchy. The first perception of the scene includes object speed and object location. The second perception of the scene includes object classification and object tracking, and the third perception includes object type and object model. A motion planner generates a motion plan for the mobile device based on the selected perception of the scene. The motion plan includes at least one navigational action for autonomous execution by the mobile device.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and method for perceiving a scene around a mobile device, such as an autonomous machine, an autonomous vehicle, a personal computing device, and/or the like and in some cases, autonomously navigating the mobile device in response. In one aspect, an object list is generated for a scene around the vehicle, which indicates relative locations and speeds of surfaces within the scene. An image including a point cloud representing surfaces in the field is obtained and segmented into one or more groups of points. A plurality of perceptions is generated based on the object list and the point cloud. The plurality of perceptions includes: a first perception including object speed and object location; a second perception including object classification and object tracking; and a third perception including object type and object model. The first perception is generated by projecting the point cloud onto a horizontal plane in an occupancy grid, and the second perception is generated based on spatial changes of the groups of points between images. The third perception may be generated using deep learning to predict a type and volumetric extend of the groups of points during movement. The perceptions are arranged in a hierarchy with the first perception being most accurate with lowest resolution, the third perception being least accurate with highest resolution, and the second perception being a baseline in the middle. A selected perception is generated based on the perception with the highest resolution that is aligned with a perception with higher accuracy. The selected perception may be used in motion planning for the mobile device or to otherwise understand objects within the scene around the mobile device.

The various systems and methods disclosed herein generally provide for perceiving a scene around a mobile device. Example implementations discussed herein reference perceiving a scene around an autonomous vehicle and generating a motion plan for autonomously navigating through the scene in response. However, it will be appreciated by those skilled in the art that the presently disclosed technology is applicable to other manned and unmanned autonomous machines, including, without limitation, terrestrial vehicles, aerial vehicles, aerospace vehicles, submersible vehicles, and/or the like, as well as other mobile devices, such as smartphones, tablet, personal computers, robotics, mobile computing devices, and/or the like.

Figure 1:
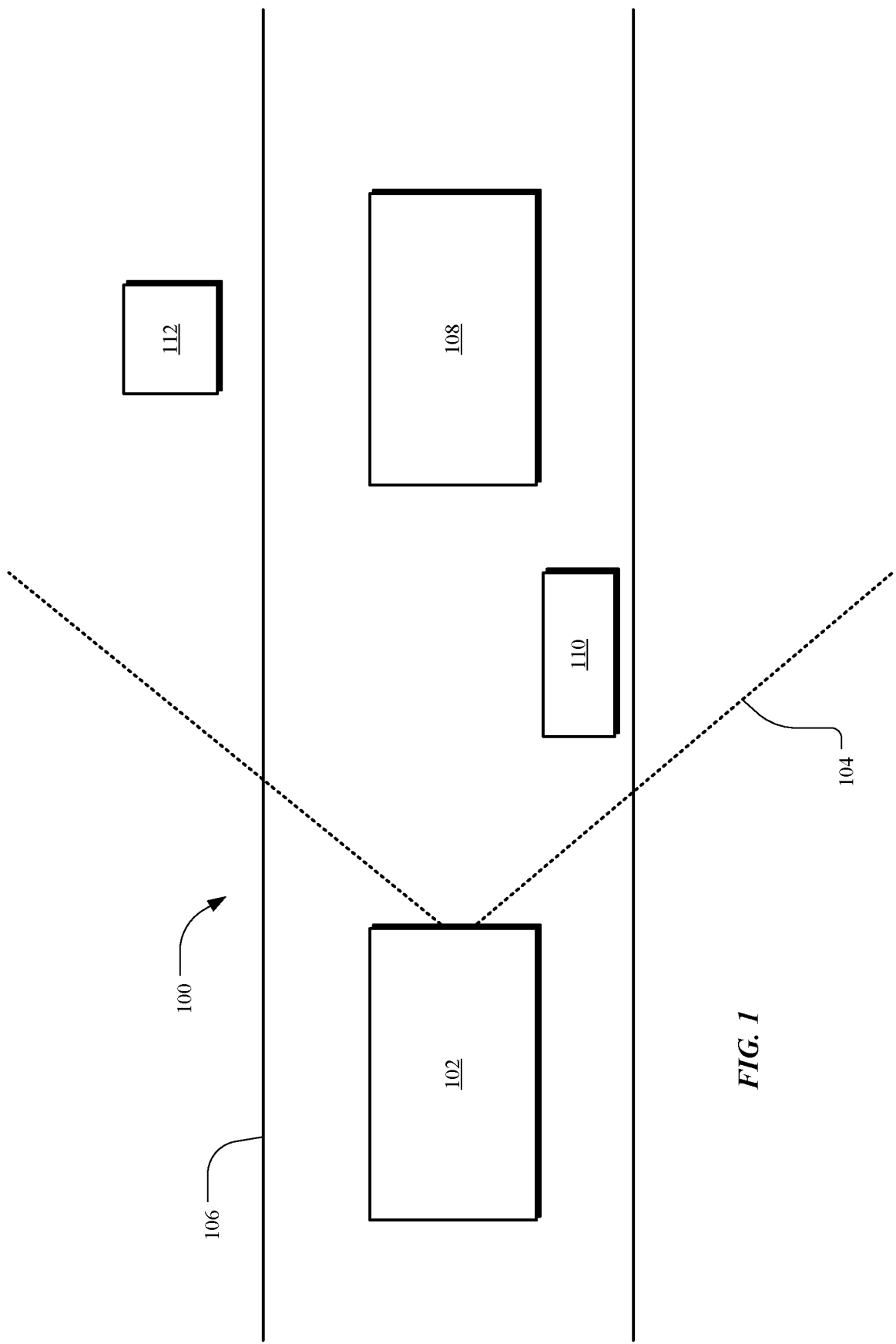
FIG. 1 illustrates an example environment for perceiving a scene around a mobile device.

For a detailed description of an example environment 100 for perceiving a scene 104 around an autonomous vehicle 102 as it travels along a travel path 106 of a route, reference is made to FIG. 1. While FIG. 1 illustrates the scene 104 as being generally in front of the autonomous vehicle 102 as it travels along the travel path 106, it will be appreciated that the scene 104 may be all or any portion of the 360 degree area around the autonomous vehicle 102. Various objects (e.g., objects 108-112), which may be mobile objects and/or stationary objects, may be located within the scene 104.

In one implementation, the autonomous vehicle 102 is autonomously navigating along a route and moving on the travel path 106 along the route. The autonomous vehicle 102 is capable of operating to move along the travel path 106 with limited input from occupants within an interior of the autonomous vehicle 102. Stated differently, rather than the user having an operational engagement with the autonomous vehicle 102 to control its actions, the occupant may simply input a destination point or other instruction and the autonomous vehicle 102 transports the occupant through a series of autonomous decisions. As a result, depending on their nature and movement, objects, including mobile, stationary, and/or traffic objects in the scene 104, including without limitation, vehicles (e.g., vehicle 108), pedestrians (e.g., pedestrian 112), personal vehicles, such bicyclists (e.g., cyclist 110), skateboarders, operators of scooters, etc.), and/or the like, may or may not impact the actions being executed by the autonomous vehicle 102 as it navigates through the scene 104. Thus, the autonomous vehicle 102 generates a selected perception of the scene 104, from which a motion plan may be generated for autonomously navigating through the scene 104.

In one implementation, the selected perception of the scene 104 is generated from a plurality of perceptions of the scene 104 based an object list and an image obtained based on sensor data. Each of the plurality of perceptions may be generated through an independent pipeline concurrently. For example, the plurality of perceptions may include a first perception of the scene 104 generated via a first pipeline (e.g., an occupancy grid pipeline), a second perception of the scene 104 via second pipeline (e.g., a baseline pipeline), and a third perception of the scene 104 via a third pipeline (e.g., a deep learning pipeline). In one implementation, the perceptions are arranged in a hierarchy with the first perception being most accurate with lowest resolution, the third perception being least accurate with highest resolution, and the second perception being a baseline in the middle. The selected perception is generated based on the perception with the highest resolution that is aligned with a perception with higher accuracy. The selected perception may be used in motion planning for the autonomous vehicle 102 or to otherwise understand objects within the scene 104.

Figure 2:
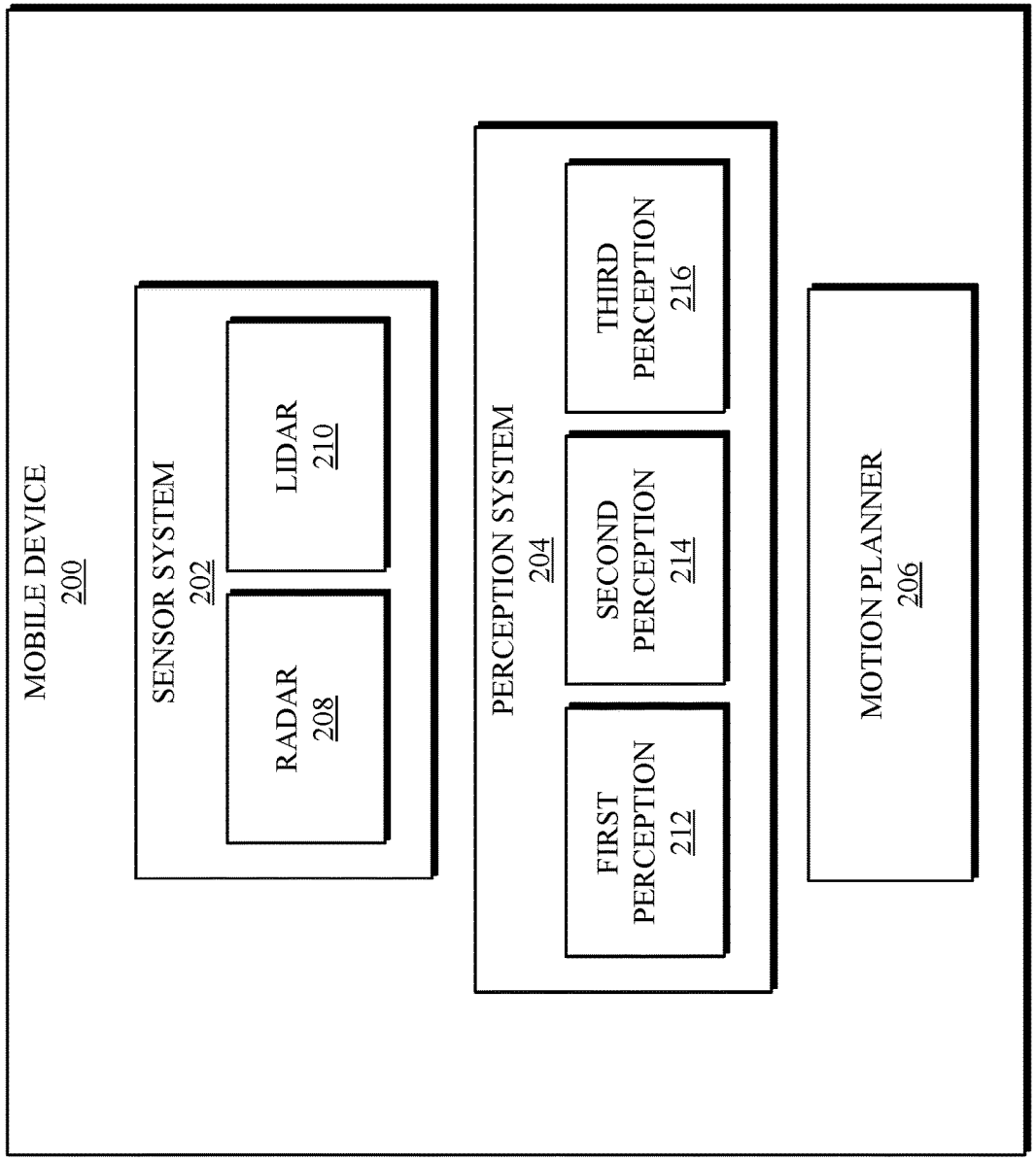
FIG. 2 is a block diagram of an example mobile device.

Turning to FIG. 2, an example mobile device 200, which may be the autonomous vehicle 102, is shown. In one implementation, the mobile device 200 includes a sensor system 202, a perception system 204, and a motion planner 206. The sensor system 202 includes one or more sensors to capture perception data of the scene 104. For example, the sensor system 202 may include one or more RADAR sensors 208, one or more LIDAR sensors 210, and/or the like. Using the perception data, the perception system 204 initiates one or more perception pipelines (e.g., perception pipelines 212-216) to generate a plurality of perceptions of the scene 104. In one implementation, the perception pipelines include a first perception pipeline 212, a second perception pipeline 214, and a third perception pipeline 216. The perception pipelines 212-216 may run concurrently and include redundancies. Thus, one of the perceptions output by the perception pipelines 212-216 is selected for use by the motion planner 206 in generating one or more actions for the mobile device 200. For example, the motion planner 206 may use the selected perception to generate a motion plan having at least one navigational action for autonomously navigating the autonomous vehicle 102 through the scene 104 in view of the objects 108-112. The motion plan may include various operational instructions for subsystems of the autonomous vehicle 102 to autonomously execute to perform the navigational action(s).

Figure 3:
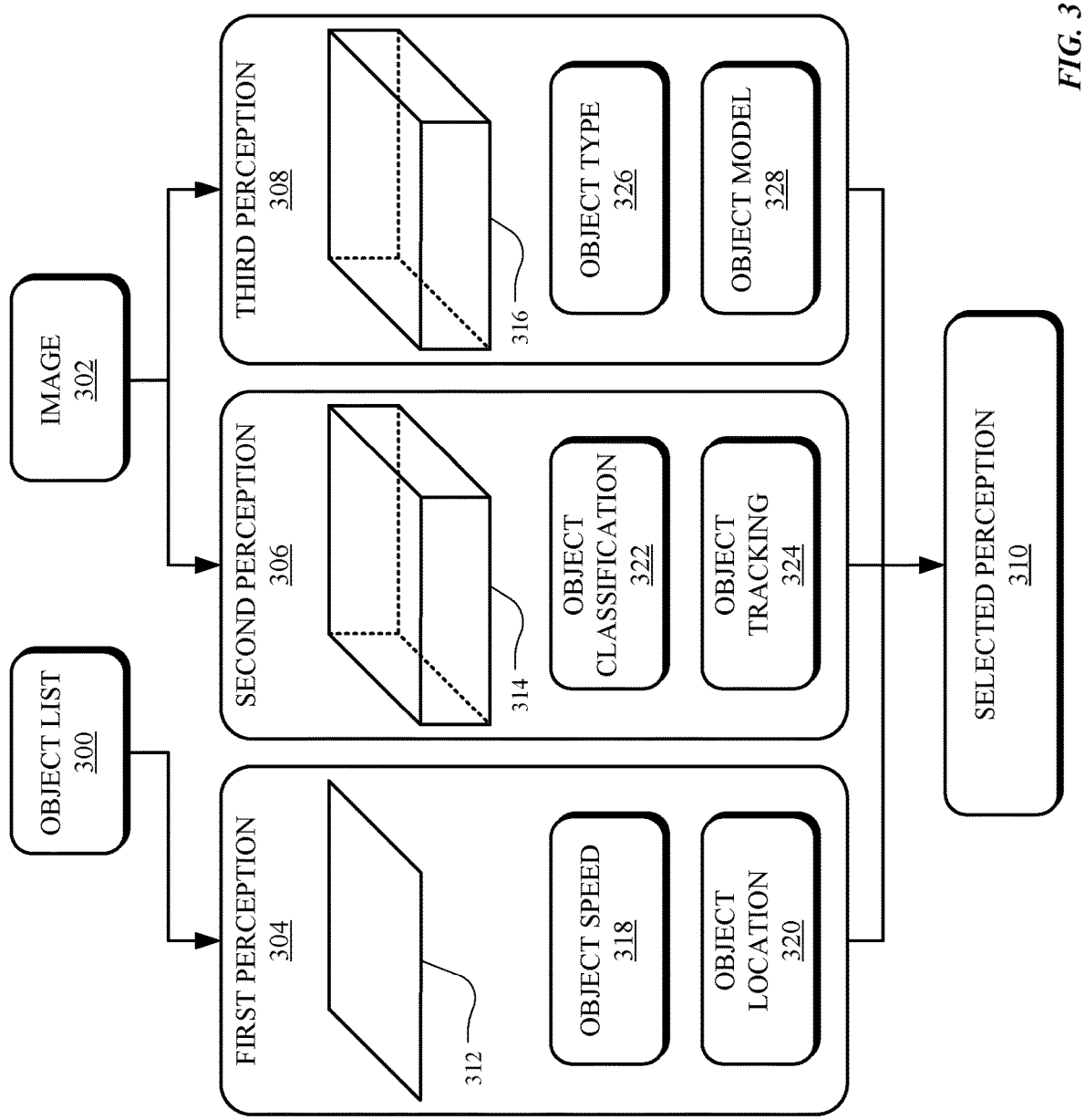
FIG. 3 is a diagram of example perceptions of the scene around the mobile device.

As can be understood from FIG. 3, in one implementation, an object list 300 and an image 302 are obtained based on the perception data captured by the sensor system 202. The object list 300 may be generated based on perception data captured using the RADAR sensor(s) 208, and the image 302 may be captured using the LIDAR sensor(s) 210. In one implementation, the object list 300 indicates a location and a speed of each surface in a set of surfaces in the scene 104 around the autonomous vehicle 102, and the image 302 includes a point cloud with one or more groups of points.

The pipelines 212-216 each generate a respective perception 304-308 of the scene 104 from which a selected perception 310 is generated for use in understanding and/or navigating the scene 104. In one implementation, a first perception 304 includes a two-dimensional plane 312 of the scene 104 from which object speed 318 and object location 320 of the objects 108-112 in the scene 104 are obtained. The second perception 306 includes a three-dimensional volume 314 from which object classification 322 and object tracking 324 for the objects 108-112 in the scene 104 are obtained. The third perception 308 includes a three-dimensional volume 316 from which object type 326 and object model 328 are obtained. The object type 326 may identify a specific type of object, while the object classification 322 may identify a class of object. Similarly, the object tracking 324 may include a velocity of an object, while the object model 328 may include a prediction of future object movement. As such, the perceptions 304-308 include a resolution hierarchy with the first perception 304 having the lowest resolution and the third resolution 308 having the highest resolution. However, as resolution increases, so does latency, with accuracy decreasing. Thus, the perceptions 304-308 also have an accuracy hierarchy with the first perception 304 having a highest accuracy and the third perception 308 having a lowest accuracy.

In one implementation, the selected perception 310 of the scene 104 is generated based on a comparison of the perceptions 304-308 of the scene within a hierarchy, including the resolution hierarchy and the accuracy hierarchy. For example, the comparison may include determining whether there is an alignment of the second perception 306 with at least one of the first perception 304 or the third perception 308 based on a detection of an object at an object location in the scene 104. Thus, the selected perception includes one of the first perception 304, the second perception 306, or the third perception 308 selected based on the alignment and the hierarchy. More particularly, the selected perception 310 is the second perception 306 when the first perception 304 aligns with the second perception 306 and the third perception 308 does not align with the second perception 306 with respect to the object at the object location. The selected perception 310 is the first perception 304 when the first perception 304 does not align with the second perception 306 with respect to the object at the object location. The selected perception 310 is the third perception 308 when the third perception 308 aligns with the second perception 306 with respect to the object at the object location.

For a more detailed description of an example implementation of the systems and methods for perceiving the scene 104 around the autonomous vehicle 102 (or other mobile device), reference is made to FIGS. 1-3. In one implementation, the object list 300 is generated at a first time by the RADAR sensor 208 arranged on and facing outwardly from a front of the autonomous vehicle 102, for example. The object list 300 indicates locations and speeds, relative to the autonomous vehicle 102, of each surface in a list of surfaces ahead of the autonomous vehicle 102. The image 302 is generated at approximately the first time by the LIDAR sensor 210 arranged on the autonomous vehicle, for example. The LIDAR image 302 includes a cloud of points representing surfaces in the scene 104 around the autonomous vehicle 102. The LIDAR image 302 is segmented into groups of points.

At the first pipeline 212, referred to in this example as an occupancy grid pipeline, points in the LIDAR image 302 are projected onto a horizontal plane in an occupancy grid, with points in the occupancy grid labeled with relative speeds of objects enumerated in the object list 300 based on spatial proximity. At the second perception pipeline 214, referred to in this example as a baseline perception pipeline, object types of groups of points are classified in the LIDAR image 300, and velocities of objects represented by groups of points in the LIDAR image 302 are estimated based on spatial changes in points in the LIDAR image 300 and a preceding LIDAR image recorded by the LIDAR sensor 210. At the third pipeline 216, referred to in this example as a deep learning pipeline, a deep learning model is implemented to predict types and volumetric extents of objects represented by groups of points in the LIDAR image 300.

In response to the deep learning pipeline 216 and the baseline perception pipeline 214 detecting a first object (e.g., the object 108) at a first location in the LIDAR image 300, the first location, a first type, and a first volumetric extent of the object 108 determined by the deep learning pipeline 216 are fed into the motion planner 206. Similarly, in response to the baseline perception pipeline 214 and the occupancy grid pipeline 212 detecting a second object (e.g., the object 110) at a second location in the LIDAR image 300 and the deep learning pipeline 216 failing to detect the second object 110, the second location, a second type, and a second velocity of the second object 110 determined by the baseline perception pipeline 214 are fed into the motion planner 206. Finally, in response to the occupancy grid pipeline 212 detecting a third object (e.g., the object 112) at a third location and the deep learning pipeline 216 and the baseline perception pipeline 214 failing to detect the third object 112, the third location and a third speed of the third object 112 determined by the occupancy grid pipeline 212 are fed into the motion planner 206. The motion planner may elect a next navigational action and, at approximately the first time, autonomously executing the next navigational action.

Generally, the autonomous vehicle 102 achieves multi-level perception of its surrounding scene 104 using the presently disclosed technology. In particular, the autonomous vehicle 102 can record concurrent LIDAR images and RADAR data while the autonomous vehicle 102 is in operation. The autonomous vehicle 102 implements the occupancy grid pipeline 212 to generate the first perception 304. The occupancy grid pipeline 212 is characterized by low latency and low opportunity for error, and may detect presence, relative locations, and relative speeds of surfaces near the autonomous vehicle 102 from the LIDAR image 302 and the object list 300 generated from the RADAR data. Substantially simultaneously, the autonomous vehicle 102 implements the baseline perception pipeline 214, which is characterized by greater latency and greater opportunity for error, to derive higher-resolution object perception data from the LIDAR image 302 in generating the second perception 306. The second perception 306 includes predictions of types and relative velocities of objects represented by points in the LIDAR image 302. Furthermore, the autonomous vehicle 102 concurrently implements the deep learning pipeline 216, characterized by even greater latency and even greater opportunity for error, to derive even higher-resolution object perception data from the LIDAR image 302 in generating the third perception 308. The third perception 308 includes predictions for full volumetric extents and higher-resolution determinations of types of objects represented in the LIDAR image 302.

The autonomous vehicle 102 may execute the pipelines 212-216 in parallel (i.e., concurrently) based on substantially concurrent LIDAR and RADAR data to detect objects in the scene 104 around the autonomous vehicle 102 with varying levels of resolution and with varying levels of possible error. In particular, the occupancy grid pipeline 212 can output perception values that are redundant to perception values output by the baseline perception pipeline 214. The autonomous vehicle 102 can thus: compare outputs of the occupancy grid and baseline perception pipelines 212-214 to verify the latter; elect to pass perception values from the latter to the motion planner 206 responsive to alignment between the occupancy grid and baseline perception pipelines 212-214; and elect to pass perception values from the former to the motion planner 206 responsive to misalignment between the occupancy grid and baseline perception pipelines 212-214. Similarly, the baseline perception pipeline 214 can output perception values that are redundant to perception values output by the deep learning pipeline 216. The autonomous vehicle 102 can thus: compare outputs of the baseline perception and deep learning pipelines 214-216 to verify the latter; elect to pass perception values from the latter to the motion planner 206 responsive to alignment between the baseline perception and deep learning pipelines 214-216; and elect to pass perception values from the former to the motion planner 206 responsive to both misalignment between the baseline perception and deep learning pipelines 214-216 and alignment between the occupancy grid and baseline perception pipelines 212-214.

The autonomous vehicle 102 may execute the pipelines 212-216 in parallel to selectively return perception values output by the pipelines 212-216 to the motion planner 206 to minimize opportunity for perception error, while also maximizing resolution of the perception values from scan cycle to scan cycle at the autonomous vehicle 102. The motion planner 206 elects a next action based on perception values received from one or more of the pipelines 212-216 and autonomously execute the next action. This process may be repeated for LIDAR and RADAR data recorded during each subsequent scan cycle at the autonomous vehicle 102 as the autonomous vehicle 102 autonomously navigates along the travel path 106.

As described herein, the sensor system 202 and/or the perception system 204 accesses the object list 300 generated at a first time by the RADAR sensor(s) 208, which may be arranged on and facing outwardly from the autonomous vehicle 102. The object list 300 indicates locations and speeds, relative to the autonomous vehicle 102, of each surface in a list of surfaces in the scene 104. The LIDAR image 302 is generated at approximately the first time by the LIDAR sensor(s) 210 arranged on the autonomous vehicle 102. The LIDAR image 302 includes a cloud of points representing surfaces in the scene 104 around the autonomous vehicle 102.

The autonomous vehicle may include one or more 360° LIDAR sensors 210, for example at the front, rear, left, and right of a top of the autonomous vehicle 102. Each LIDAR sensor 210 can output the image 302 as a three-dimensional distance map, such as in the form of a 3D point cloud representing distances between the LIDAR sensor 210 and an external surface within the field of view of the LIDAR sensor 210, per rotation of the LIDAR sensor 210 (i.e., once per scan cycle). For example, a LIDAR sensor 210 on the autonomous vehicle can output LIDAR images 302 at a rate of 20 Hz. Each LIDAR image 302 includes a 3D point cloud spacing a 360° field of view about a yaw axis of the autonomous vehicle 102, and each point in the LIDAR image 302 represents a distance from the LIDAR sensor 210 to a surface in the scene 104 around the autonomous vehicle 102. Furthermore, in one variation in which the autonomous vehicle 102 includes multiple LIDAR sensors 210 arranged in different positions and/or orientations on the autonomous vehicle 102, each LIDAR sensor 210 outputs one LIDAR image 302 per scan cycle, and the autonomous vehicle 102 combines concurrent LIDAR images 302 received from the LIDAR sensors 210 into one composite LIDAR frame per scan cycle based on known positions of the LIDAR sensors 210 on the autonomous vehicle 102. The autonomous vehicle 102 may pass a LIDAR image 300, from a single LIDAR sensor 210 or combined from multiple LIDAR sensors 210, into the pipelines 212-216 described herein.

The RADAR sensor(s) 208 may be arranged on the autonomous vehicle and configured to detect surfaces in the field of view of the sensor 208 (e.g., ahead of the autonomous vehicle 102). The RADAR sensor(s) 208 may output a list of these surfaces and their positions once per scan cycle. For example, in one implementation, the RADAR sensor 208 defines an approximately 2D field of view extending horizontally and outwardly from the front of the autonomous vehicle 102. Once per scan cycle (e.g., at a rate of 20 hz), the RADAR sensor 208 outputs the object list 300 for objects detected in its field of view (e.g., up to 64 objects). For each object, the object list 300 may include an azimuthal angle relative to the RADAR sensor 208, a distance from the RADAR sensor 208, and a speed relative to the RADAR sensor 208 or to the autonomous vehicle 102 more generally. In one variation in which the autonomous vehicle includes multiple RADAR sensors 208 arranged in different positions and/or orientations on the autonomous vehicle 102, each RADAR sensor 208 outputs one object list 300 per scan cycle, and the autonomous vehicle combines concurrent RADAR-based object lists received from the RADAR sensors 208 into one composite object list 300 per scan cycle based on known positions of the RADAR sensors 208 on the autonomous vehicle 102. The autonomous vehicle 102 passes the object list 300, from a single RADAR sensor 208 or combined from multiple RADAR sensors 208, into the pipeline 212, as described herein.

In some implementations, the sensor system 202 also includes one or more color cameras mounted at various locations on the autonomous vehicle 102, such as facing outwardly from the front, rear, left lateral, and right lateral sides of the autonomous vehicle 102. Each camera may output a video feed containing a sequence of digital photographic images (or "camera images") at a rate of 20 Hz. Further, the autonomous vehicle 102 may additionally or alternatively include a set of infrared emitters configured to project structured light into a field near the autonomous vehicle and/or a set of infrared detectors (e.g., infrared cameras). The autonomous vehicle 102 transforms images output by the infrared detector(s) into a depth map of the scene 104. Similarly, the autonomous vehicle 102 may include a set of infrared proximity sensors arranged along the perimeter of the base of the autonomous vehicle 102 and configured to output signals corresponding to proximity of objects and pedestrians within some distance (e.g., one meter) of the autonomous vehicle 102. It will be appreciated that the autonomous vehicle 102 can include any other sensors in the sensor system 202 configured to detect objects and surfaces in the scene 104 around the autonomous vehicle 102. The autonomous vehicle communicates data output by the sensors in the sensor system 202 into the one or more of the pipelines 212-216.

Regarding the first perception pipeline 212, the pipeline 212 projects points in the first LIDAR image 302 onto the 2D plane 313 (e.g., a horizontal plane) in an occupancy grid. The pipeline 212 labels points in the occupancy grid with relative speeds of objects enumerated in the first object list 300 based on spatial proximity. Generally, the autonomous vehicle 102 injects a RADAR-based object list and a concurrent (e.g., a nearest) LIDAR image into the pipeline 212 to rapidly determine whether an object is present ahead of or otherwise around the autonomous vehicle 102. The pipeline 212 further determines the position with a high degree of accuracy and minimal opportunity for error. Thus, the pipeline 212 provides the object speed 312 and the object location 314. However, the pipeline 212 has low resolution and therefore provides minimal or no perception of a type of the object or its trajectory.

More specifically, the pipeline 212 compresses or projects the object list 300 and the concurrent LIDAR image 302 into a virtual two-dimensional occupancy grid, including points that represent surfaces around the autonomous vehicle 102 at a horizontal "slice" offset above the ground plane and intersecting the autonomous vehicle 102. The pipeline 212 labels a subset of these points with relative speed information extracted from the object list 300. The pipeline 212 therefore represents a robust, low-latency, low-processing load pipeline with very low opportunity for error (i.e., failure to detect an object near the autonomous vehicle 102).

In one implementation, upon receipt of the LIDAR image 302, the pipeline 212: filters a ground plane out of the LIDAR image 302; extracts a "slice" (e.g., defined by near-null thickness) of the LIDAR image 302 through a horizontal plane that intersects the field of view of the RADAR sensor 208; projects points in this LIDAR slice onto a virtual occupancy grid; and parses the object list 300 from the RADAR sensor 208. Alternately, the pipeline 212 compresses the filtered LIDAR frame (with ground plane removed) onto a horizontal 2D plane. For a first object in the RADAR-based object list 300, the pipeline 212: projects a virtual object into the occupancy grid based on the azimuthal angle and distance associated with this first object in the object list 300 and based on known offset between the RADAR and LIDAR sensors 208 and 210; isolates a set of LIDAR-based points in the occupancy grid that intersect (or fall near) the virtual object; and groups and labels these points with the relative speed of the first object. The pipeline 212 repeats this process for each other object in the object list 300, thereby linking objects in the object list to LIDAR-based points in the occupancy grid and projecting object information from the object list 300 onto the corresponding LIDAR-based points.

The pipeline 212 may fuse concurrent RADAR and LIDAR data into a 2D occupancy grid of the first perception 304, which represents surfaces around the autonomous vehicle 102. The pipeline 212 may label select points or point groups in the occupancy grid, representing discrete surfaces (e.g., up to 64) surfaces in the field ahead of the autonomous vehicle, with relative speeds based on concurrent data output by the RADAR sensor 208. Furthermore, because the pipeline 212 generally implements minimal interpretation and straightforward fusion techniques to combine concurrent LIDAR and RADAR data, the pipeline 212 may generate the first perception 304 rapidly (i.e., with minimal latency) and with minimal computation load (i.e., with low-bandwidth) during a scan cycle. However, the first perception 304 may therefore omit type and trajectory information of objects near the autonomous vehicle 102. The perception system 204 may therefore pass the same LIDAR image 300 into the second pipeline 214 to generate baseline predictions for type and intent of 3D objects that are otherwise represented as 2D points or surfaces in the occupancy grid of the first perception 304.

In particular, the autonomous vehicle 102 can execute autonomous object avoidance, vehicle following, obstacle avoidance, and other basic autonomous navigational techniques based on the occupancy grid of the first perception 304 to autonomously navigate toward an assigned destination while avoiding collisions with external objects. For example, when traversing a highway or segment of road free of traffic signals and nonparallel intersections, the autonomous vehicle 102 may achieve autonomous navigation based on the first perception 304 alone and with limited processing load. However, when traversing scenes with intersections, traffic signals, and greater variance in object type and trajectory, the autonomous vehicle 102 may implement more sophisticated perception techniques, such as including the one or more of the pipelines 214-216, to identify types of objects near the autonomous vehicle 102, predict their intents, and predict their volumetric extents. The autonomous vehicle 102 may execute autonomous navigation actions according to this more sophisticated perception of the scene 104 around the autonomous vehicle 102.

Turning next to the second perception pipeline 214, the LIDAR image 302 is segmented into groups of points. In one implementation, the pipeline 214 classifies object types of groups of points in the LIDAR image 302 as the object classification 316 and estimates velocities of objects represented by groups of points in the LIDAR image 302 as the object racking 318 based on spatial changes in points in the LIDAR image 302 and a preceding LIDAR image recorded by the LIDAR sensor 210. Generally, the pipeline 214 derives baseline object type and intent information for objects represented in a LIDAR image 302.

In one implementation, the pipeline 214: filters a ground plane corresponding to the surface on which the autonomous vehicle 102 is moving on the travel path 106 out of the LIDAR image 302. The pipeline 214 segments remaining points in the LIDAR image 302 to isolate groups (or "clusters") of points that represent discrete objects of "generic" or unknown types. The pipeline 214 implements object tracking or other tracking techniques to track these discrete groups of points between preceding LIDAR frames and the current LIDAR image 302 and calculate velocities (i.e., speeds and directions relative to the autonomous vehicle 102) of these individual groups of points.

In one variation, the pipeline 214 further implements a baseline classifier to predict a type of object represented by each group of points. For example, the baseline perception pipeline can classify a group of points in the LIDAR image 302 as representing one of the pedestrian 112, the vehicle 108, or the cyclist 110 based on point density, location, and/or size of the group of points. The pipeline 214 outputs a rough approximation of the class of an object represented by a group of points. The pipeline 214 may selectively implement object tracking models configured to track objects of specific classes based on object types associated with distinct groups of points in the LIDAR image 302. For example, the baseline classifier of the pipeline 214 may interpret a small cluster of points exhibiting a high aspect ratio in the vertical direction (i.e., exhibiting significantly greater height than weight) to represent a pedestrian. A pedestrian-type object tracking model can include a linear Kalman filter, which predicts low peak speed but high possible variance in direction of a pedestrian over time.

In another example, the pipeline 214 interprets a cluster of points spanning a wider area and depicting a soft corner to represent a vehicle, and a vehicle-type object tracking model can implement a "vehicle model" to predict motion of a vehicle-type object. Further, the pipeline 214 may segment points representing one vehicle into multiple groups. The pipeline 214 may leverage like object types of groups of points, predicted by the baseline classifier, to combine these adjacent groups of points of the same object type and characterized by similar velocities, into one larger point group that represents this one vehicle.

The pipeline 214 thus transforms points in the LIDAR image 302 into predictions of object types, their locations, and their velocities with higher-resolution information than the pipeline 212. However, the pipeline 214 may output a yet-incomplete representation of objects in the scene 104 around the autonomous vehicle 102 due to line of sight obfuscation or decreased point density (i.e., resolution) with increased distance from the autonomous vehicle 102. Further, application of a classifier and object-specific tracking models within the pipeline 214 may introduce some opportunity for error.

With respect to the third perception pipeline 216, a deep learning model may be implemented to predict types and volumetric extents of objects represented by groups of points in the LIDAR image 300 to obtain the object type 320 and the object model 322. Generally, the pipeline 216 implements a deep learning model or other artificial intelligence, computer vision, statistical method, and/or the like to predict a type of an object near the autonomous vehicle 102 and the full volumetric extent, orientation, and velocity of the object based on the LIDAR image 302. In particular, the LIDAR image 302 may contain points that represent only one or two sides of an object (e.g., another vehicle) near the autonomous vehicle 102 due to obscuration of the remainder of the object in the field of view of the LIDAR sensor 210 by these one or two surfaces. The remainder of this object may therefore not be represented in the LIDAR image 302, and the pipelines 212-214 may therefore be unable to directly derive a total extent of the object from the LIDAR image 302. Therefore, even though only one or two sides (or "faces") of an object may be represented by a group of points in the LIDAR image 302, the pipeline 216 implements a deep learning model to predict type, size, shape, and/or orientation of the object, which may subsequently enable the pipeline 216 to generate a more accurate prediction of the intent (e.g., trajectory, future position) of the object.

In one implementation, the pipeline 216 segments the LIDAR image 302 to cluster discrete groups of points that may correspond to discrete objects, as described above. For a group of points in the LIDAR image 302, the pipeline 216 implements a deep learning model (or other artificial intelligence technique) to predict a type of the object represented by points in this group, such as based on relative positions, density, quantity, distance, and/or the like from the autonomous vehicle 102, as well as other features or characteristics of this group of points. In one implementation, the pipeline 216: tracks the group of points from a preceding LIDAR frame to the current LIDAR image 302; calculates a relative and absolute velocity of the group of points over this period of time; and passes the relative or absolute velocity of the group of points into the deep learning model as another feature predictive of a type of the object represented by the group of points. The pipeline 216 thus predicts a type of the object, such as a car, truck, pedestrian, bicyclist, motorcyclist, or animal, etc.

Upon predicting a type of the object represented by the group of points, the pipeline 216 accesses a generic volumetric representation for objects of this type (e.g., a 3D bounding box) and scales the generic volumetric representation for this object type to the group of points. The pipeline 216 implements an object-tracking model specific to this object type to track the object's motion from a preceding LIDAR image to the current LIDAR image 302 and to extrapolate a trajectory and/or a future location of the object. The pipeline 216 may further predict an orientation of the object based on its trajectory and its location in the scene 104 around the autonomous vehicle 102 (e.g., based on when the object is in the same traffic lane, an opposing traffic lane, a bike lane, a driveway, a sidewalk, etc.). The pipeline 216 orients and aligns the scaled volumetric representation to this group of points. The scaled volumetric representation represents a 3D volumetric extent of the full extent of the object and its orientation. The pipeline 216 labels this scaled volumetric representation with an extrapolated trajectory and/or future location of this object. The pipeline 216 can repeat this process for other groups of objects detected in the LIDAR image 302.

The pipeline 216 thus generates a more complete, more comprehensive perception of objects, their extents, and their intents in the scene 104 around the autonomous vehicle 102. However, the pipeline 216 may exhibit more latency and require more processing power to generate this more comprehensive perception of nearby objects. The pipeline 216 may also detect, identify, track, and characterize objects with less predictability and may introduce more error than the pipelines 212-214, such as by ignoring or de-escalating objects in the travel path 106 of the autonomous vehicle 102. For example, the pipeline 216 may yield more error and less predictable performance than the pipelines 212-214 for certain objects, such as: for types of objects that the pipeline 216 has not been trained to identify; for objects depicted in LIDAR frames in uncommon orientations; and/or for uncommon configurations (e.g., colors, sizes, shapes) of object types that the pipeline 216 was previously trained to identify.

For example, the pipeline 216 may be trained to detect small clusters of points that represent unique pedestrians, such as even for a clusters of points that contains insufficient information (e.g., insufficient point density) for a baseline classifier in the pipeline 214 to distinguish the cluster of points as a pedestrian or as anything other than noise or a generic surface. When the pipeline 216 identifies a small cluster of points as a pedestrian, the perception system 204 may track this unique pedestrian over a sequence of LIDAR frames in the pipeline 216 and leverage a pedestrian motion model to predict future locations of this unique pedestrian. However, if an animal (e.g., a dog, a deer) runs into the road ahead of the autonomous vehicle 102 and the pipeline 216 has not been trained to detect an animal of this type, size, or coloring, etc., the pipeline 216 may not adequately detect or identify the animal. Nonetheless, the pipeline 212 may detect presence of a surface of the animal ahead of the autonomous vehicle 102, and the pipeline 214 may detect the animal as a generic object or as a pedestrian-type object. Thus may enable the pipeline 214 to track the animal and predict its future location relative to the autonomous vehicle 102, given that movement of an animal and movement of a human may be similar. Therefore, the perception system 204 may fuse or otherwise combine the pipelines 212-216 to form a more complete, more accurate perception of the scene 104 around the autonomous vehicle 102 before electing and executing a next navigational action using the motion planner 206.

By executing these pipelines 212-216 in parallel, the autonomous vehicle 102 leverages the output of one pipeline to achieve redundancy for a higher-level pipeline concurrently executed by the autonomous vehicle 102. For example, the pipeline 216 can predict types of objects, their full extents, and their orientations, even for objects characterized by low point densities, from data contained in a LIDAR image 302. Nonetheless, the pipeline 216 may fail to identify all objects in a LIDAR image 302, such that the autonomous vehicle 102 may not account for all objects nearby when electing a next navigational action based solely on an output of the pipeline 216. However, the pipeline 214 may detect all (or nearly all) surfaces within a 3D manifold near the autonomous vehicle 102 and calculate relative velocities of these objects, thereby enabling the autonomous vehicle 102 to elect a next navigational action based on more complete perception of objects nearby. However, the pipeline 214 may incorrectly classify a type of object represented by a group of points in the LIDAR image 302 and/or may incorrectly predict a relative velocity of the object from a series of LIDAR frames. In particular, because the pipeline 214 implements segmentation and/or a classifier, the pipeline 214 may introduce some error into perception of objects in the scene 104 near the autonomous vehicle 102. However, the pipeline 212 may be characterized by a very high probability of detecting all surfaces in at least a portion of the scene 104 (e.g., near the front of the autonomous vehicle 102) and their relative speeds, which the autonomous vehicle 102 can then leverage to elect a next navigational action characterized by a high probability of accounting for all objects that may impact navigation of the autonomous vehicle 102.

Similarly, the pipeline 216 outputs a prediction for the full extent of an object in the scene 104 around the autonomous vehicle 102 and can yield greatest recall for tracking unique objects from LIDAR frame to LIDAR frame. However, the pipeline 216 may also introduce the opportunity for greatest error. The perception system 204 can therefore fall back on the pipelines 212-214 for detection of other objects that may have been ignored or deescalated by the pipeline 216. For example, for each object detected by the pipeline 216, the autonomous vehicle 102 can verify that the pipelines 212-214 detected objects in corresponding locations in the scene 104 around the autonomous vehicle 102. If verified, the perception system 204 communicates object information, such as including type, location, orientation, relative velocity, and/or extent, etc. generated by the pipeline 216 into the motion planner 206. However, the pipeline 214 may have detected more objects than the pipeline 216. In this case, the perception system 206 may identify each object detected by the pipeline 214 but not coinciding spatially with an object detected by the pipeline 216 and communicate object information, including type, location, and relative velocity generated by the pipeline 214 into the motion planner 206. Furthermore, the pipeline 212 may have detected more objects than the pipeline 214. In this case, the perception system 206 may identify each surface detected by the pipeline 212 but not coinciding spatially with an object detected by the baseline perception pipeline 214 and communicate object information, including location and relative velocity generated by the occupancy grid pipeline, into the motion planner 206.

As discussed herein, the perception system 204 can execute the pipelines 212-216 in parallel and then merge, check, and/or selectively output results of these pipelines 212-216 to the motion planner 206. In one implementation, during a comparison from which the selected perception 304 is generated, the perception system 204 correlates a first set of objects detected by the pipeline 216, a second set of objects detected by the pipeline 214, and a third set of surfaces detected by the pipeline 212 based on spatial proximity in three and two dimensions. The perception system 204 then discards any object in the first set not matched to an object or surface in the second or third sets, respectively, and returns the remainder of the first set of objects, with volumetric extents, object type tags, velocities, etc. calculated by the pipeline 216, to the motion planner 206. The perception system 204 thus verifies object locations detected by the pipeline 216 with objects and surfaces detected by the pipelines 212-214 and elect to return verified object data generated by the pipeline 216 to the motion planner 206, since object data in the third perception 308 generated by the pipeline 216 may represent the most complete perceptions of these objects.

Additionally, the perception system 204 compares the first set of objects and the second set of objects to isolate a second subset of objects detected by the pipeline 214 but not detected by the pipeline 216. The perception system 204 verifies the second subset of objects based on the third set of objects detected by the pipeline 212 and returns the second subset of objects to the motion planner 206. Stated differently, the perception system 204 can fall back on the pipeline 214 to enhance the perception of the pipeline 216 because the pipeline 216 may output a more complete perception of the scene 104 near the autonomous vehicle 102 than the pipeline 212 and because the lower likelihood of error afforded by the pipeline 214 renders the second subset of objects likely to be present near the autonomous vehicle 102 even if not detected by the pipeline 216.

Furthermore, the perception system 204 compares the second subset of objects and the third set of objects to isolate a third subset of objects detected by the pipeline 212 but not detected by the pipeline 214 and returns the third subset of objects to the motion planner 206. In other words, the perception system 204 can fall back on the pipeline 212 to enhance perception of the pipelines 214-216 because the pipeline 212 may output a complete perception of the scene 104 near the autonomous vehicle 102, albeit with less compete information than the pipelines 214-216, and because very low likelihood of error afforded by the pipeline 212 renders the third subset of objects highly likely to be present near the autonomous vehicle 102, even if not detected by the pipelines 214-216.

The perception system 204 thus aggregates outputs of the pipelines 212-216 based on similarities and differences between the pipelines 212-216 and outputs this aggregated perception of the scene 104 as the selected perception 304 to the motion planner 206. The motion planner 206 implements a motion planning model to calculate a new local path for the autonomous vehicle 102, as well as steering, brake, accelerator positions, among other vehicle subsystem actions, to achieve the new local path based on the selected perception 304. The autonomous vehicle 102 may autonomously execute the actions accordingly. For example, the autonomous vehicle 102 may implement object avoidance techniques to avoid surfaces detected only by the pipeline 212. In another example, the autonomous vehicle 102 may elect to move slowly around a stopped vehicle-type object detected by the pipeline 214 but afford a greater buffer distance and longer wait time for a pedestrian-type object detected by the pipeline 214. Furthermore, the autonomous vehicle 102 may elect to navigate at greater speed and/or greater acceleration with less buffer distance based on full extents of nearby objects detected by the pipeline 216.

In one implementation in which the sensor system 202 further includes a 2D camera (e.g., a 2D RGB camera), the perception system 204 leverages 2D photographic images output by the 2D camera to classify or otherwise augment classification of groups of points in the pipeline 216. For example, the perception system 204 may detect and identify objects in a 2D image and project object types detected in the 2D camera image onto groups of points in an approximately concurrent LIDAR image 302 to classify or otherwise verify classification of the groups of points in the LIDAR image 302.

In one implementation, upon receipt of a 2D image from the 2D camera, the pipeline 216 implements a deep learning model, object recognition, or other computer vision technique to identify various discrete objects (e.g., pedestrian, vehicles, cyclists, animals) in the 2D image. For each object identified in the 2D image, the pipeline 216: defines a 2D bounding box around the object; calculates a set of rays from an origin of the 2D camera to vertices of the 2D bounding box based on intrinsic properties of the 2D camera; projects a volume defined by the set of rays (e.g., a square cone) into the concurrent LIDAR image 302 based on known positions of the 2D camera and the LIDAR sensor 210 on the autonomous vehicle 102; isolates a set of pixels that intersect this projected volume; group these pixels; and labels this group of pixels with a type of the object determined from the 2D image.

Furthermore, the pipeline 216 may estimate a distance of the object detected in the 2D image from the 2D camera, such as based on intrinsic and extrinsic properties of the 2D camera and changes in position of the object in a sequence of 2D images output by the 2D camera. The pipeline 216 trims the volume projected into the concurrent LIDAR image 302 to a narrower depth range containing the estimated distance to the object and scans the trimmed volume in the LIDAR image 302 for intersecting points that correspond to the object. The pipeline 216 can repeat this process for each other object detected in the 2D image.

The perception system 204 may leverage outputs of pipelines 212-216 to generate a visualization depicting the perception of the environment for presentation, for example using a display, to passengers occupying the autonomous vehicle 102. In one example, for a first object detected by the pipeline 216 and verified by one or more of the pipelines 212-214, the perception system 204 defines a 3D bounding box in the LIDAR image 302 around the extent of the object predicted by the pipeline 216. The 3D bounding box may contain and extend beyond a group of points corresponding to this first object in the LIDAR image 302. The perception system 204 may assign a color to the bounding box based on a type of the first object determined by the pipeline 216. As a particular example, the perception system 204 may color opaque edges of the 3D bounding box: green for vehicle object types; orange for cyclist object types; and purple for pedestrian object types. The perception system 204 may generate a label positioned adjacent the 3D bounding box in the LIDAR image 302, indicating a type, speed, and/or direction of the first object.

In this example, for a second object detected by the pipeline 214 and verified by the pipeline 212 but not detected by the pipeline 216, the perception system 204 may overlay a translucent 3D volume (e.g., a 3D "cloud," or a 3D translucent window) around the corresponding group of points in the LIDAR image 302 and tint the translucent 3D volume according to a type of the second object determined by the pipeline 214. Because the pipeline 214 predicts a type of object represented by a group of points but not the extent of the second object, the perception system 204 defines a translucent 3D volume that intersects this group of points to indicate that the autonomous vehicle 102 has detected the corresponding second object. The translucent "cloud" may thus compensate for lack of perception of the full extent of the second object in the LIDAR image 302. The perception system 204 may also tint this translucent 3D volume with a color that corresponds to the type of object represented by this group of points, as predicted by the pipeline 214 (e.g., green for vehicles; orange for cyclists; purple for pedestrians).

Continuing this example, for a third surface detected by the pipeline 212 but not by the pipelines 214-216, the perception system 204 projects a 3D cloud of a predefined size (e.g., a one-meter cube) in a generic color (e.g., red) extending upwardly from a ground plane in the LIDAR image 302 and located at a lateral and longitudinal position that intersects this third surface depicted in the occupancy grid. The translucent 3D volume may be tinted with a color assigned to the pipeline 212 (e.g., red).

The perception system 204 can repeat this process of this example for other objects and surfaces detected in the LIDAR image 302 and render an annotated LIDAR frame on an interior display inside the vehicle in real-time. The perception system 204 thus visually communicates to an occupant of the autonomous vehicle 102 which objects the autonomous vehicle 102 has perceived in the scene 104 and the amount of information that the autonomous vehicle 102 has derived about these objects, ranging from presence, location relative to the autonomous vehicle 102, and speed relative to the autonomous vehicle 102, to object type and velocity relative to the autonomous vehicle 102, to volumetric extent, orientation, and intent.

Figure 4:
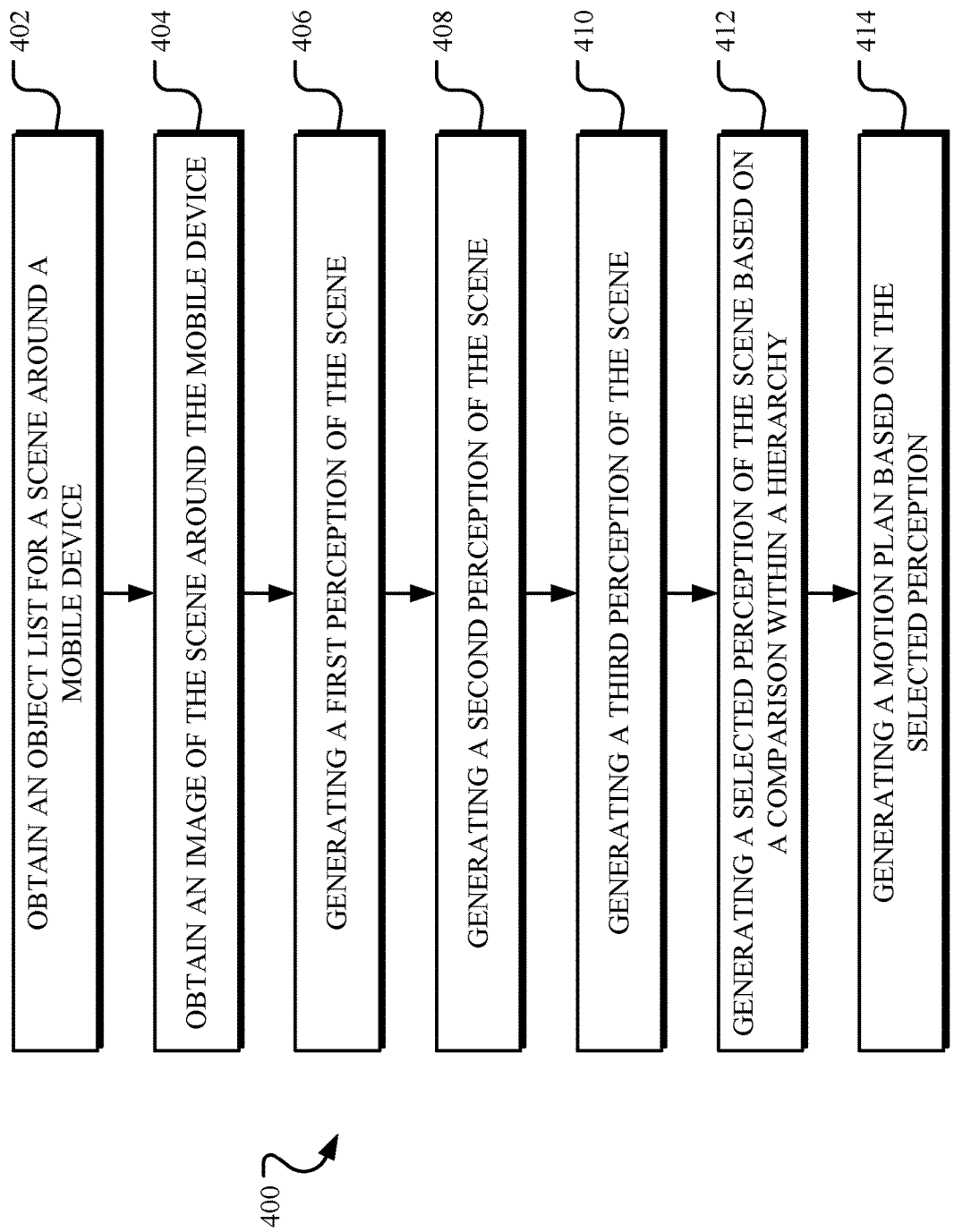
FIG. 4 illustrates example operations for perceiving a scene around a mobile device.

Turning to FIG. 4, example operations 400 for perceiving a scene around a mobile device. In one implementation, an operation 402 obtains an object list for the scene around the mobile device. The object list indicates a location and a speed of each surface in a set of surfaces in the scene around the mobile device. An operation 404 obtains an image of the scene around the mobile device. The image includes a point cloud, and the point cloud is segmented into one or more groups of points. In one implementation, the object list is generated from object list data captured using at least one RADAR sensor, and the image is captured using at least one LIDAR sensor.

In one implementation, an operation 406 generates a first perception of the scene. The operation 406 generates first perception of the scene by projecting the point cloud onto a horizontal plane in an occupancy grid. The operation 406 further labels the point cloud in the occupancy grid based on the object list. In one implementation, the first perception of the scene includes the point cloud in the occupancy grid being labeled with respective speeds based on spatial proximity corresponding to the location and the speed of each surface in the set of surfaces in the object list. From the occupancy grid, object speeds and object locations for one or more objects are obtained.

An operation 408 generates a second perception of the scene. In one implementation, the operation 408 generates the second perception of the scene based on spatial changes of the one or more groups of points from a preceding image to the image. For example, generating the second perception of the scene may include estimating velocities of objects represented by the one or more groups of points based on the spatial changes and object classes represented by the one or more groups of points. As such, the operation 408 may provide object tracking and object classification.

An operation 410 generating a third perception of the scene. The operation 410 generates the third perception of the scene by predicting a type and a volumetric extent of the one or more groups of points. In one implementation, the operation 410 implements a deep learning model to predict a trajectory of one or more objects based on the type and the volumetric extent of the one or more objects represented by the one or more groups of points. Thus, the operation 410 may provide object type and object model. The first perception of the scene, the second perception of the scene, and the third perception of the scene define a plurality of perceptions of the scene. The operations 406, 408, and 410 may be initiated or otherwise executed concurrently.

In one implementation, an operation 412 generates a selected perception of the scene. The operation 412 identifies one of the plurality of perceptions of the scene based on a comparison of the first perception of the scene, the second perception of the scene, and the third perception of the scene within a hierarchy. For example, the first perception of the scene may have a first accuracy and a first resolution, the second perception of the scene may have a second accuracy and a second resolution, and the third perception of the scene may have a third accuracy and a third resolution. The hierarchy includes the first accuracy being higher than the second accuracy and the second accuracy being higher than the third accuracy, as well as the first resolution being lower than the second resolution and the second resolution being lower than the third resolution. Based on this, the selected perception of the scene is the one of the plurality of perceptions of the scene having a highest resolution within the hierarchy that is verified by another of the plurality of perceptions having a higher accuracy within the hierarchy during the comparison.

As another example, the comparison of the plurality of perceptions to generate the selected perception includes determining whether there is an alignment of the second perception of the scene with at least one of the first perception of the scene or the third perception of the scene based on a detection of an object at an object location in the scene. The selected perception of the scene is the second perception of the scene when the first perception of the scene aligns with the second perception of the scene and the third perception of the scene does not align with the second perception of the scene with respect to the object at the object location. The selected perception of the scene is the first perception of the scene when the first perception of the scene does not align with the second perception of the scene with respect to the object at the object location. The selected perception of the scene is the third perception of the scene when the third perception of the scene aligns with the second perception of the scene with respect to the object at the object location.

An operation 414 generates a motion plan for the mobile device based on the selected perception of the scene, the motion plan including at least one navigational action for autonomous execution by the mobile device.

Figure 5:
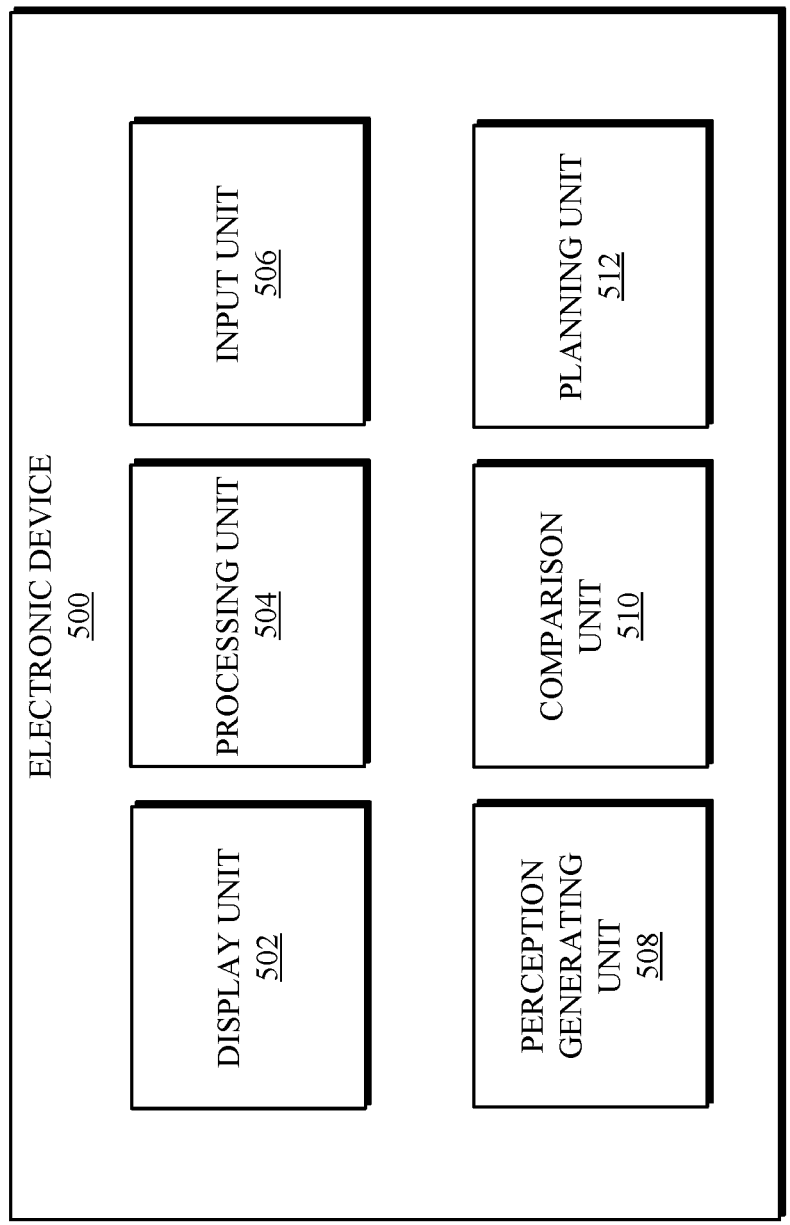
FIG. 5 is a functional block diagram of an electronic device including operational units arranged to perform various operations of the presently disclosed technology.

Turning to FIG. 5, an electronic device 500 including operational units 502-512 arranged to perform various operations of the presently disclosed technology is shown. The operational units 502-512 of the device 500 are implemented by hardware or a combination of hardware and software to carry out the principles of the present disclosure.

It will be understood by persons of skill in the art that the operational units 502-512 described in FIG. 5 may be combined or separated into sub-blocks to implement the principles of the present disclosure. Therefore, the description herein supports any possible combination or separation or further definition of the operational units 502-512.

In one implementation, the electronic device 500 includes a display unit 502 configured to display information, such as a graphical user interface, and a processing unit 504 in communication with the display unit 502 and an input unit 506 configured to receive data from one or more input devices or systems. Various operations described herein may be implemented by the processing unit 504 using data received by the input unit 506 to output information for display using the display unit 502.

Additionally, in one implementation, the electronic device 500 includes units implementing the operations described with respect to FIG. 4. For example, the operations 406-410 may be implemented by a perception generating unit 508, the operation 412 may be implemented by a comparison unit 510, and the operation 414 may be implemented with an planning unit. Each of these units may execute the corresponding operations with one or more computing units. In some implementations, a controlling unit implements various operations for controlling the operation of a vehicle based on the operations implemented by the units 502-512.

Figure 6:
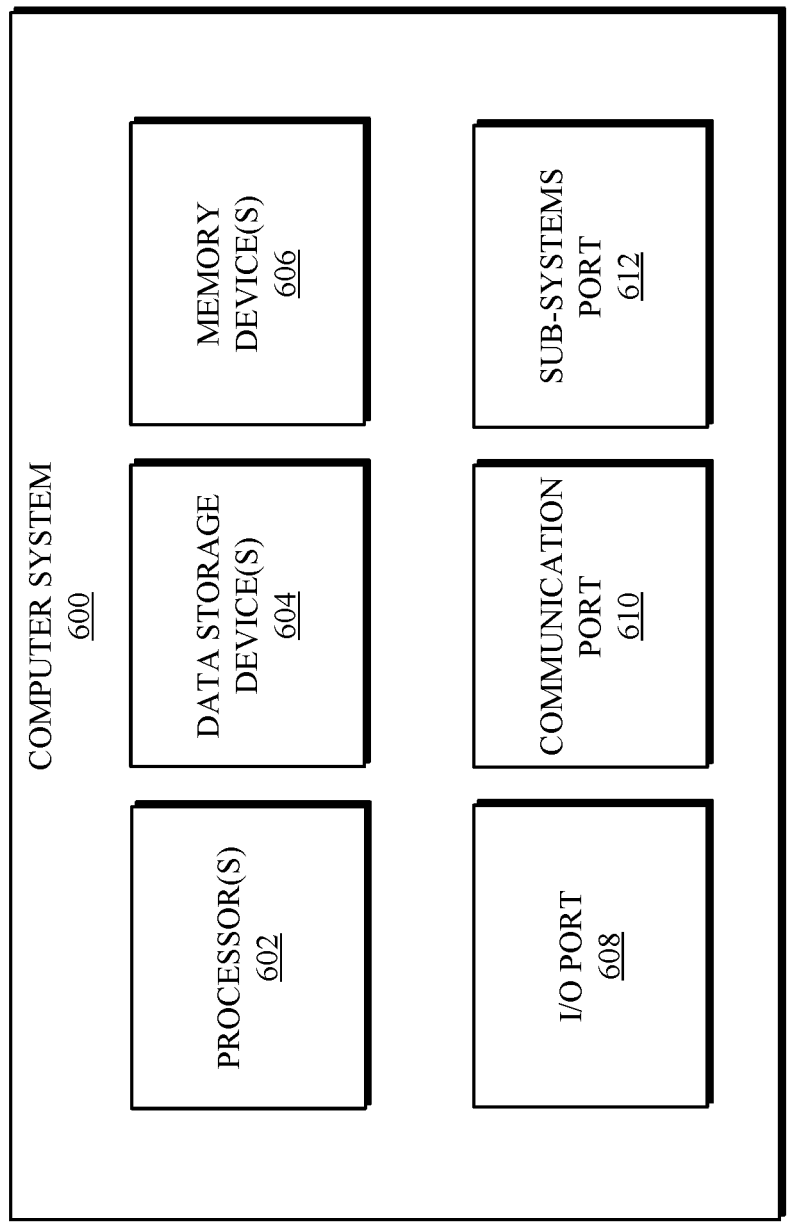
FIG. 6 is an example computing system that may implement various aspects of the presently disclosed technology.

Referring to FIG. 6, a detailed description of an example computing system 600 having one or more computing units that may implement various systems and methods discussed herein is provided. The computing system 600 may be applicable to the measuring system 102 and other computing or network devices. It will be appreciated that specific implementations of these devices may be of differing possible specific computing architectures not all of which are specifically discussed herein but will be understood by those of ordinary skill in the art.

The computer system 600 may be a computing system is capable of executing a computer program product to execute a computer process. Data and program files may be input to the computer system 600, which reads the files and executes the programs therein. Some of the elements of the computer system 600 are shown in FIG. 6, including one or more hardware processors 602, one or more data storage devices 604, one or more memory devices 606, and/or one or more ports 608-612. Additionally, other elements that will be recognized by those skilled in the art may be included in the computing system 600 but are not explicitly depicted in FIG. 6 or discussed further herein. Various elements of the computer system 600 may communicate with one another by way of one or more communication buses, point-to-point communication paths, or other communication means not explicitly depicted in FIG. 6.

The processor 602 may include, for example, a central processing unit (CPU), a microprocessor, a microcontroller, a digital signal processor (DSP), and/or one or more internal levels of cache. There may be one or more processors 602, such that the processor 602 comprises a single central-processing unit, or a plurality of processing units capable of executing instructions and performing operations in parallel with each other, commonly referred to as a parallel processing environment.

The computer system 600 may be a conventional computer, a distributed computer, or any other type of computer, such as one or more external computers made available via a cloud computing architecture. The presently described technology is optionally implemented in software stored on the data stored device(s) 604, stored on the memory device (s) 606, and/or communicated via one or more of the ports 608-612, thereby transforming the computer system 600 in FIG. 6 to a special purpose machine for implementing the operations described herein. Examples of the computer system 600 include personal computers, terminals, workstations, mobile phones, tablets, laptops, personal computers, multimedia consoles, gaming consoles, set top boxes, and the like.

The one or more data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. The data storage devices 604 may include, without limitation, magnetic disk drives, optical disk drives, solid state drives (SSDs), flash drives, and the like. The data storage devices 604 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 600 includes one or more ports, such as an input/output (I/O) port 608, a communication port 610, and a sub-systems port 612, for communicating with other computing, network, or vehicle devices. It will be appreciated that the ports 608-612 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 600 via the I/O port 608. For example, an electrical signal generated within the computing system 600 may be converted to another type of signal, and/or vice-versa. In one implementation, the environment transducer devices sense characteristics or aspects of an environment local to or remote from the computing device 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 600, such as, physical movement of some object (e.g., a mechanical actuator), heating or cooling of a substance, adding a chemical substance, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 610 to communicate one or more other machines, either directly over a point-to-point communication path, over a wide area network (WAN) (e.g., the Internet), over a local area network (LAN), over a cellular (e.g., third generation (3G), fourth generation (4G) network, or fifth generation (5G)), network, or over another communication means. Further, the communication port 610 may communicate with an antenna for electromagnetic signal transmission and/or reception. In some examples, an antenna may be employed to receive Global Positioning System (GPS) data to facilitate determination of a location of a machine, vehicle, or another device.

The computer system 600 may include a sub-systems port 612 for communicating with one or more systems related to a vehicle to control an operation of the vehicle and/or exchange information between the computer system 600 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, perception data, perceptions, perception pipelines, motion plans, and software and other modules and services may be embodied by instructions stored on the data storage devices 604 and/or the memory devices 606 and executed by the processor 602. The computer system 600 may be integrated with or otherwise form part of a vehicle. In some instances, the computer system 600 is a portable device that may be in communication and working in conjunction with various systems or sub-systems of a vehicle.

The present disclosure recognizes that the use of such information may be used to the benefit of users. For example, the location information of a vehicle may be used to provide targeted information concerning a "best" path or route to the vehicle and to avoid objects. Accordingly, use of such information enables calculated control of an autonomous vehicle. Further, other uses for location information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
obtaining an object set, the object set indicating a location and a speed of each surface in a set of surfaces in an environment, the environment being external to a mobile device;
obtaining an image of the environment, the image including a point cloud, the point cloud including one or more groups of points;
generating first perception data corresponding to the environment, the first perception data including a first accuracy and a first resolution;
generating second perception data corresponding to the environment, the second perception data including a second accuracy and a second resolution;
generating third perception data corresponding to the environment, the third perception data including a third accuracy and a third resolution, the first accuracy, the second accuracy, and the third accuracy forming an accuracy hierarchy, the first resolution, the second resolution, and the third resolution forming a resolution hierarchy;
determining whether there is an alignment of the second perception data with at least one of the first perception data or the third perception data based on a detection of an object at an object location in the environment; and
generating selected perception data based on the alignment of the second perception data with at least one of the first perception data or the third perception data, the accuracy hierarchy, and the resolution hierarchy.

2. The method of claim 1, further comprising:
generating a motion plan based on the selected perception data, the motion plan including at least one navigational action.

3. The method of claim 2, wherein the mobile device is an autonomous vehicle, the autonomous vehicle being autonomously directed through the environment based on the at least one navigational action.

4. The method of claim 1, wherein the accuracy hierarchy includes the first accuracy being higher than the second accuracy and the second accuracy being higher than the third accuracy, and the resolution hierarchy includes the first resolution being lower than the second resolution and the second resolution being lower than the third resolution.

5. The method of claim 1, wherein the selected perception data is the second perception data when the first perception data aligns with the second perception data and the third perception data does not align with the second perception data with respect to the object at the object location, the selected perception data being the first perception data when the first perception data does not align with the second perception data with respect to the object at the object location, the selected perception data being the third perception data when the third perception data aligns with the second perception data with respect to the object at the object location.

6. The method of claim 1, wherein the first perception data is generated by projecting the point cloud onto a horizontal plane in an occupancy grid, the point cloud in the occupancy grid being labeled based on the object set.

7. The method of claim 6, wherein generating the first perception data includes the point cloud in the occupancy grid being labeled with respective speeds based on spatial proximity corresponding to the location and the speed of each surface in the set of surfaces in the object set.

8. The method of claim 1, wherein the second perception data is generated based on spatial changes of the one or more groups of points from a preceding image to the image.

9. The method of claim 8, wherein generating the second perception data includes estimating velocities of objects represented by the one or more groups of points based on the spatial changes.

10. The method of claim 1, wherein the third perception data is generated by predicting a type and a volumetric extent of the one or more groups of points.

11. The method of claim 10, wherein generating the third perception data includes implementing a deep learning model to predict a trajectory of one or more objects based on the type and the volumetric extent of the one or more objects represented by the one or more groups of points.

12. The method of claim 1, wherein the first perception data, the second perception data, and the third perception data define a plurality of perception datasets corresponding to the environment, the selected perception data having a highest resolution within the plurality of perception datasets within the resolution hierarchy that is verified by another of the plurality of perception datasets having a higher accuracy within the resolution hierarchy.

13. The method of claim 1, wherein the first perception data, the second perception data, and the third perception data are generated concurrently.

14. The method of claim 1, wherein the object set is generated from object set data captured using at least one RADAR sensor and the image is captured using at least one LIDAR sensor.

* * * * *